July 18, 1939.　　　J. H. HOERN　　　2,166,686
SELF-LOCKING ADJUSTING SCREW
Filed April 22, 1937
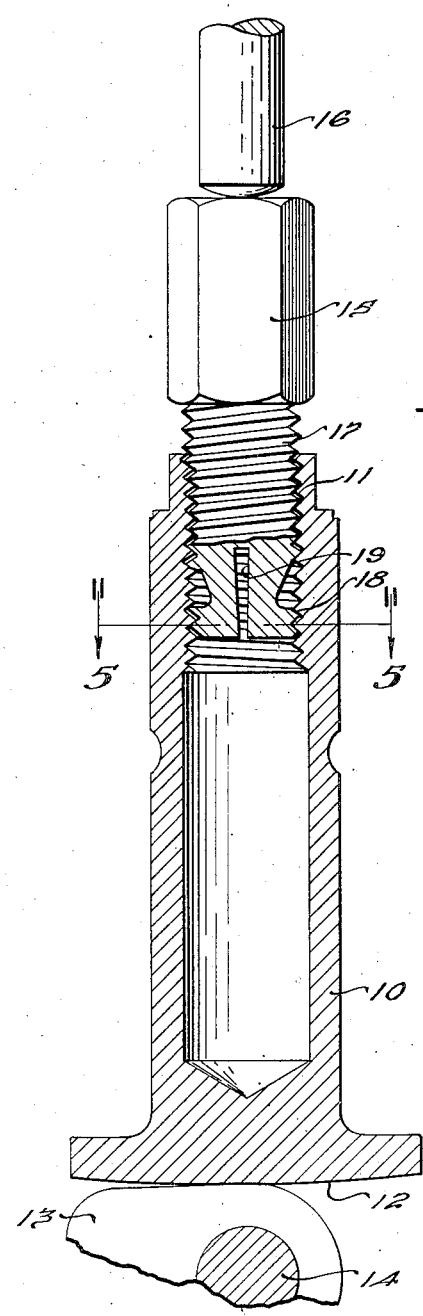
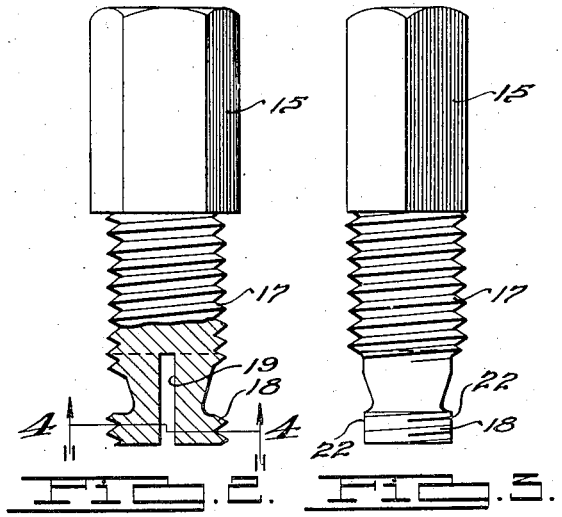
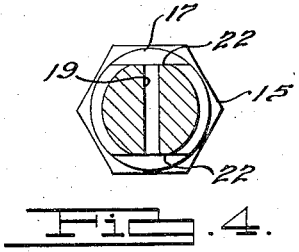
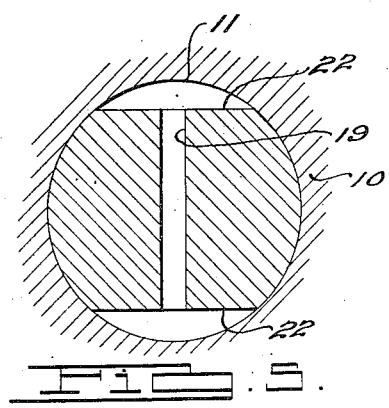
INVENTOR
Joseph H. Hoern.
BY
Harness, Dickey & Pierce
ATTORNEYS.

Patented July 18, 1939

2,166,686

UNITED STATES PATENT OFFICE 2,166,686

SELF-LOCKING ADJUSTING SCREW

Joseph H. Hoern, Saginaw, Mich., assignor to Eaton Manufacturing Company, Cleveland, Ohio, a corporation of Ohio Application April 22, 1937, Serial No. 138,292

5 Claims. (Cl. 151—22)

This invention relates to self-locking connections and to a improved method of making the same.

The inventive concepts of the present invention are applicable to practically any form of threadably interconnected members in order to establish a definite locking relation and prevent unscrewing of one of the members with respect to the other except under predetermined torque loads.

While many important practical uses may be found for the improved locking connections of the present invention as well as the method of making the same, the primary purpose for which these connections are designed is for positioning an adjusting stud in a valve tappet in order that when the stud is screwed into the valve tappet body to predetermined adjusted position, the locking connection will serve to maintain this adjustment even though the construction as a whole is subjected to abnormal shocks and stresses during use.

It will be readily understood that the specific form of locking connection illustrated and described herein has a number of features which render it particularly adaptable for use in valve tappet constructions.

It is a primary object of the present invention to provide a valve tappet construction which is extremely simple, cheap to manufacture, positive in operation, and which is designed to compensate for relatively wide variations in the tolerances of the parts with which it is associated.

The present invention contemplates the provision of an adjusting stud of the generic type disclosed in Patent No. 2,035,055 to Dyer, and the invention of the present application is an improvement thereover.

Like in the Dyer structure, the improved locking stud of the present invention may have a pair of axially spaced threaded sections, the lead of the thread of one of the sections being offset axially with respect to the lead of the thread of the other section and having the second section resiliently but integrally connected to the first section in order to tension the threads when both sections are threaded into an aperture having a uniform continuous lead.

The invention further contemplates the provision of an improved method of manufacturing locking connections of this generic type which greatly expedites and simplifies the construction as a whole and renders possible a more positive and uniform locking of the members than has been heretofore obtained.

Many other and further objects, advantages, and features of the present invention will become clearly apparent from the following description when considered in connection with the accompanying drawing forming a part thereof.

In the drawing:

Figure 1 is a side elevational view with parts in section of a conventional valve tappet construction embodying one of the improved locking screws of the present invention.

Fig. 2 is a side elevational view of one of the improved lock screws with parts thereof in section.

Fig. 3 is a side elevational view of the improved locking screw shown in Fig. 2 illustrating the manner in which the sides of a portion of the screw shank are flatted to provide the necessary relief.

Fig. 4 is a transverse sectional view taken substantially on the line 4—4 of Fig. 2 illustrating in detail the cross sectional configuration of the lower threaded section of the screw.

Fig. 5 is a transverse sectional view taken substantially on the line 5—5 of Fig. 1 illustrating in detail the manner in which the lower threaded section of the screw mates with the internally threaded aperture with which it is associated.

With more particular reference to the drawing, it will be readily understood that the improved locking screws illustrated, provide a construction for threadably interconnecting a pair of members which may find wide and practical utility in many different fields. However, it will be readily understood that the improved threaded connections illustrated in the drawing and described below are primarily adapted for use in connection with adjusting screws in valve tappets. In Fig. 1 a valve tappet 10 of substantially conventional construction is disclosed. This valve tappet comprises a substantially cylindrical body portion which is provided with an axially disposed internally threaded bore aperture 11 at its upper end, and in its lower end is provided with a slightly crowned surface 12 which surface is adapted to engage a cam 13 secured to cam shaft 14 as is conventional in constructions of this general character.

The bore 11 is of substantially uniform diameter throughout and is internally threaded as is conventional in constructions of this general character. This bore 11 is adapted to receive an adjusting screw 15 which, as is conventional, is provided with a generally polygonal head portion which has its upper end formed to provide a bearing for the lower end of a valve stem or push rod 16. The shank of the screw has the peripheral surface thereof relieved to provide two spaced co-axially disposed sections 17 and 18 which sections are of the same diameter. The portions of the screw interconnecting these threaded sections is of generally frusto-conical form having a maximum diameter adjacent the upper of the threaded sections and a minimum diameter adjacent the lower of the threaded sections. The screw is provided with an axially extending diametrically disposed slot 19 which extends from the lower axial end of the screw throughout the entire length of the lower threaded section 18, and throughout the entire length of the portion of the screw shank interconnecting the sections thereof, thereby dividing the lower section into two separate portions. Consequently, due to the frusto-conical form of the portion of the screw shank interconnecting the sections, it will be seen that the portions of the lower section are connected with the main portion of the screw shank by structures of spring sections.

The two sections 17 and 18 are each provided on their exterior peripheral surfaces with a series of threads of the same pitch. These threads may be formed in any suitable manner such for example as by a conventional screw machine, and at the time the threads are formed pains are taken to see that the lead of the thread on one of the sections is axially offset with respect to the lead of the thread on the other of the sections. As will be more fully appreciated from the following description, it will be understood that the magnitude of the offset of this lead of one section with respect to the other is an extremely important factor in determining the torque resistance of the screw to turning movement when the same has been threaded into an internally threaded aperture such for example as the aperture 11 in the upper end of the valve tappet 10.

It will be readily appreciated that as the screw shown in Fig. 2 is threaded into the aperture 11 in the valve tappet 10 as soon as the threads on the section 17 start to enter the internally threaded bore 11 the portions of the screw making up the lower section 18 will inherently be compressed toward each other radially as the result of the axial offset of the threads on this section and the threads on the main body portion 17. The amount which these portions of the section 18 are urged radially inwardly toward each other will be dependent upon the magnitude of the axial offset of the threads of one section with respect to the threads of the other section. Consequently, it will be readily appreciated that the resistance of the screw to turning movement may be accurately regulated by not only regulating the magnitude of the offset of these threads but also by regulating the thickness and structure of the spring section which serves to interconnect one of the threaded sections with the other. This spring section which serves to interconnect the threaded sections may be varied by increasing or reducing the size of the slot 19 formed in the axial end of the screw, and also may be varied by controlling the size and shape of the generally frusto-conical portion of the screw shank which interconnects the threaded sections.

It will be readily seen that as the threads of the section 17 enter the internally threaded bore 11 the portions of the lower threaded section 18 will tend to be moved radially inwardly as the result of the riding-up of the threads of this section on the threads of the internally threaded bore due to the axial offset of the lead of the thread of one section with respect to the lead of the thread of the other section. The slot 19 will permit radial movement of these generally semi-cylindrical portions of the lower screw section in one direction but virtually no relative inward radial movement will be permitted in a direction parallel to the slot 19. Consequently, in order to prevent binding or stripping the threads as the result of binding at this point, it has been found necessary to relieve the sides of the lower section to provide flatted surfaces 22 substantially perpendicular to the slot 19. These flattened or relieved surfaces serve to permit a contraction or partial collapse of the lower threaded section without binding upon the threads of the internally threaded bore 11.

From the foregoing it will be readily appreciated that the improved self locking screw construction described is extremely simple and cheap to manufacture and efficient in operation.

Many other and further modifications of the invention disclosed, falling within the scope of the subjoined claims, will be clearly apparent to those skilled in the art.

What is claimed is:

1. A self locking screw for valve tappets comprising a shank portion including a pair of integrally connected, axially spaced threaded sections, the lead of the thread of one of said sections being offset axially with respect to the lead of the thread of the other of said sections, one of said sections being slotted and having the peripheral surface thereof relieved at opposite sides in planes transverse to the plane of the slot.

2. A self locking adjusting screw for valve tappets comprising a shank portion including a pair of integrally connected axially spaced threaded sections, the lead of the thread of one of said sections being offset axially with respect to the lead of the thread of the other of said sections, opposite sides of one of said sections being relieved to provide flats, said screw having an axially extending diametrically disposed slot formed therein disposed in a plane substantially perpendicular to said flats.

3. A self locking adjusting screw for valve tappets comprising a shank portion having formed thereon upper and lower axially spaced externally threaded sections, the lead of the thread of one of said sections being offset axially with respect to the lead of the thread of the other of said sections, the portion of said screw shank interconnecting said threaded sections being tapering and being of larger diameter adjacent the upper of said sections than adjacent the lower section, said lower section having the peripheral surface thereof relieved to provide flats on diametrically opposite sides thereof, said screw having an axially extending diametrically disposed slot therethrough lying in a plane substantially perpendicular to said flats.

4. A self locking and adjusting screw for valve tappets comprising a shank portion having formed thereon upper and lower axially spaced externally threaded sections, the lead of the thread of one of said sections being offset axially with respect to the lead of the thread of the other of said sections, the portion of said screw shank interconnecting said threaded sections being tapering and being of larger diameter adjacent the upper of said sections than adjacent the lower section, said lower section having the peripheral surface thereof relieved to provide flats on diametrically opposite sides thereof, said screw having an axially extending vertically disposed slot formed therein lying in a plane substantially perpendicular to said flats and extending from the end of the screw throughout said lower threaded section and the portion of said screw shank interconnecting said threaded sections.

5. A self locking screw for valve tappets comprising a shank portion including a pair of integrally connected axially spaced threaded sections, the lead of the thread of one of said sections being offset axially with respect to the lead of the other of said sections, one of said sections having an axially extending diametrically disposed slot formed therein, the peripheral surface of said last mentioned section being relieved to provide flats lying in planes substantially transverse to the plane of the slot.

JOSEPH H. HOERN.